Feb. 8, 1949. S. E. SHULLAW 2,460,911
CLUTCH LEVER ATTACHMENT
Filed June 13, 1947 2 Sheets-Sheet 1

Inventor
Sherman E. Shullaw

By Clarence A. O'Brien
and Harvey B. Jacobson
Attorneys

Feb. 8, 1949. S. E. SHULLAW 2,460,911
CLUTCH LEVER ATTACHMENT
Filed June 13, 1947 2 Sheets-Sheet 2
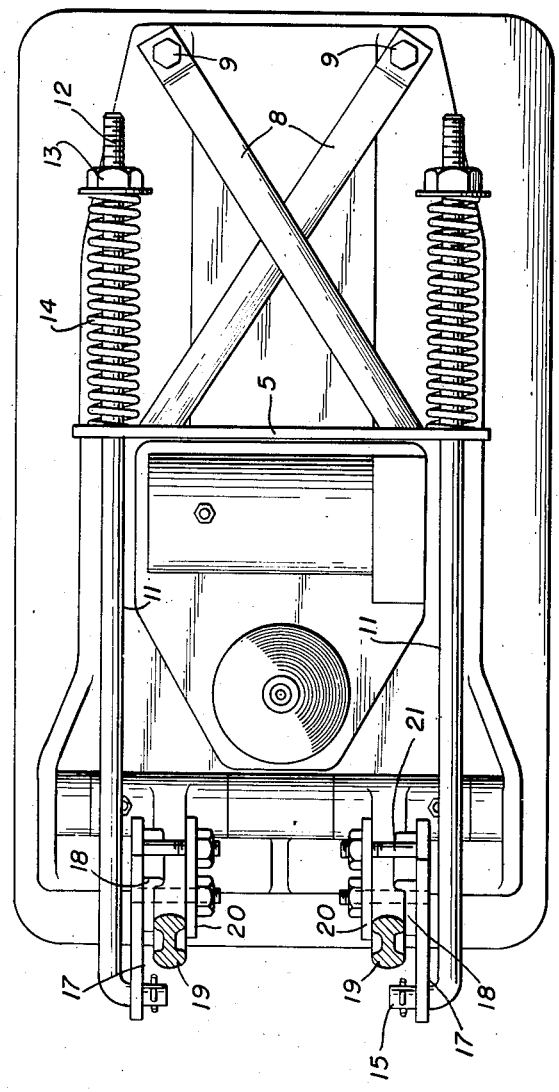
Fig. 2.
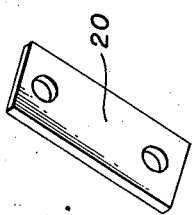
Fig. 5.
Fig. 3.
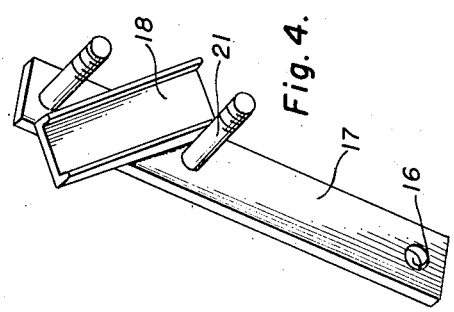
Fig. 4.
Inventor
Sherman E. Shullaw
By Clarence A. O'Brien
and Harvey B. Jacobson
Attorneys Patented Feb. 8, 1949

2,460,911

UNITED STATES PATENT OFFICE 2,460,911

CLUTCH LEVER ATTACHMENT

Sherman E. Shullaw, Peoria, Ill.

Application June 13, 1947, Serial No. 754,413

5 Claims. (Cl. 74—97)

The present invention relates to new and useful improvements in attachments for the clutch lever for crawler or track laying tractors and more particularly to means to facilitate the operation of the clutch lever in a manner to relieve the arm strain or fatigue on the operator during long and continued operation of the lever.

The universal method of steering crawler or track laying tractors is by means of two steering clutch levers and two foot brakes, one each for each track or crawler. Considerable effort is required to operate the steering clutch levers and when these levers are pulled continuously by the operator for several hours it is extremely tiring and therefore it is an object of the present invention to provide an attachment intended to assist the operator in pulling the clutch levers during the releasing action thereof.

A further object of this invention is to provide an attachment of this character which may be easily and quickly mounted in position on a tractor of this character without necessitating any changes or alterations in the construction thereof.

A still further object is to provide a device of this character of simple and practical construction, which is efficiently reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 2 is a top plan view with parts broken away and shown in section;

Figure 3 is a perspective view of one of the lever releasing rods;

Figure 4 is a perspective view of the clamping bracket for the lever;

Figure 5 is a similar view of the clamping plate for use with the clamping bracket; and, Figure 6 is a perspective view of the pull plate for the releasing rods.

Figure 1:
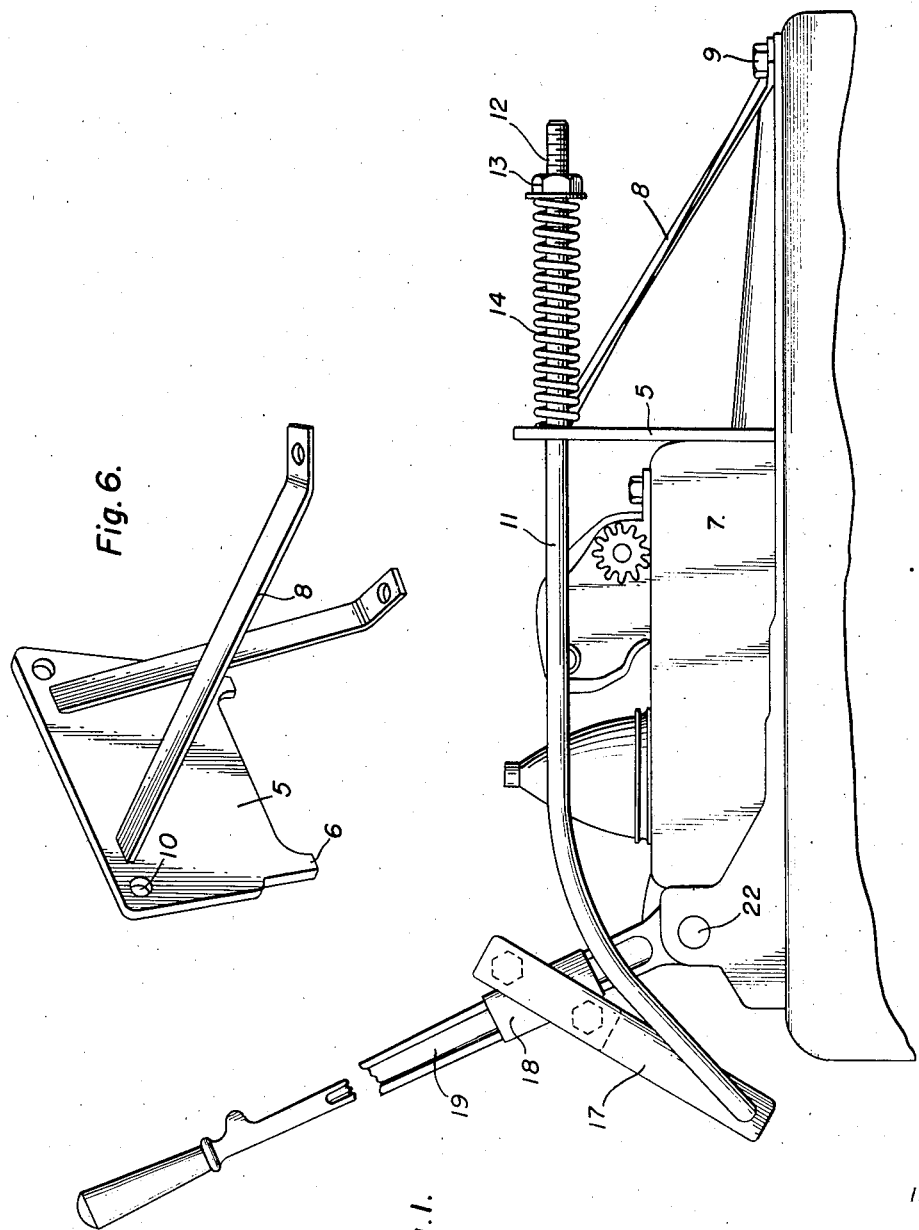
Figure 1 is a side elevational view showing the clutch attachment mounted in position on the transmission cover plate of a tractor.

Referring now to the drawings in detail, wherein for the purpose of illustration I have disclosed a preferred embodiment of the invention the numeral 5 designates a pull plate having legs 6 at its lower edge for supporting the plate in an upright position on a transmission cover plate 7 of a conventional form of a track laying tractor. A pair of braces 8 have one end welded to the rear upper portion of the pull plate 5, the braces being crossed and inclined downwardly for attaching at their lower ends by the cap screws 9 of the transmission cover.

Openings 10 are formed adjacent the upper corners of the plate 5 in which the rear ends of a pair of pull arms 11 are slidably mounted. The rear ends of the arms 11 are threaded as shown at 12 for threadedly mounting an adjusting nut 13 thereon and mounted on the arms between the plate 5 and the adjusting nut there is a coil spring 14, the nut 13 being adjusted to place tension on the spring to exert a rearward pulling action on the arms 11.

The front ends of the rods 11 are curved and formed with an angular extension 15 pivotally received in an opening 16 at the lower end of a link 17 of strap metal.

To one side of the upper portion of the link 17 is welded a channel shaped bracket 18 which conformly receives one side of a clutch lever 19 adjacent its lower ends. To the opposite side of the clutch lever is placed a clamping plate 20 secured in clamping co-operation with the bracket 18 by means of bolts and nuts 21 carried by the link 17.

The channel shaped bracket 18 is welded to the link 17 in an inclined position so that the lower end of the link 17 projects forwardly in an inclined position with respect to the lever and with the lower end of the link positioned below the pivot 22 for the lever when the lever is moved into its forward position as shown in Figure 1 of the drawings.

Accordingly in the operation of the device when the levers 19 are moved forwardly the front end of the pull arms 11 will be positioned below the center of the pivot for the levers whereby the tension of the springs 14 will hold the levers in their forward position.

The levers 19 are pulled rearwardly to effect steering of the tractor and after the initial rearward movement of the levers to raise the front ends of the arms 11 above the center of the pivot 22 the springs 14 will pull the levers rearwardly to counteract the force required to operate the levers and thus relieve the operator of the strain involved in the operation of the levers.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A clutch lever attachment comprising a pull rod connected at one end to a lever, means slidably supporting the other end of the rod, and spring means between the rod and the supporting means and exterting a pulling force on the rod, said rod being movable by the lever past the pivotal center of the lever against the tension of said spring means to hold the lever in one position.

2. A clutch lever attachment comprising a pull rod, a link rigidly attached to a lever and providing a pivotal connection for one end of the rod, means slidably supporting the other end of the rod, and spring means between the rod and the supporting means and exerting a rearward pulling force on the rod, said rod being movable forwardly of the pivotal center of the lever to hold the lever in a forward position and movable rearwardly of the pivotal center of the lever to pull the lever toward its rearward position.

3. A clutch lever attachment comprising a stationary pull plate, a rod slidably mounted in the plate and pivoted at one end to a lever, and spring means mounted on the rear end of the rod and bearing against the plate to exert a constant rearward pulling force on the rod, said pivoted end of the rod being movable forwardly past the pivotal center of the lever to hold the lever in a forward position.

4. A clutch lever attachment comprising a stationary pull plate, a rod slidably mounted in the plate, a link rigidly attached at one end to a lever and having a free end converging toward an adjacent end of the rod and pivoted thereto, and spring means carried by the other end of the rod and bearing against the plate to exert a constant rearward pulling force on the lever, said pivoted end of the rod being movable past the pivotal center of the lever to hold the lever in a forward position.

5. A clutch lever attachment comprising a stationary pull plate, a rod slidably mounted in the plate, a link pivoted at one end to the front end of the rod, means rigidly securing the link to a lever, said link extending downwardly and forwardly from the lever to position the front end of the rod below the pivotal center of the lever when the lever is in its forward position, and spring means carried by the rear end of the rod and bearing against the pull plate to exert a constant rearward pulling force on the lever.

SHERMAN E. SHULLAW.

REFERENCES CITED

The following references are of record in the file of this patent:

UNITED STATES PATENTS

| Number | Name | Date |
| --- | --- | --- |
| 525,724 | Scott | Sept. 11, 1894 |
| 1,804,903 | Wemp | May 12, 1931 |
| 2,027,659 | Weisbrod | Jan. 14, 1936 |